(12) United States Patent
Jeon et al.

(10) Patent No.: US 11,308,111 B2
(45) Date of Patent: *Apr. 19, 2022

(54) METHODS, SYSTEMS, AND MEDIA FOR PRESENTING CONTENT BASED ON A GENERIC RATING

(71) Applicant: Google LLC, Mountain View, CA (US)

(72) Inventors: Joon-Hee Jeon, Palo Alto, CA (US);
Michael Kleinerman, San Francisco, CA (US); Sungsoo Lim, Seoul (KR);
Sun-Gi Hong, Yongin-si (KR); Jae Won Seo, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 38 days.

This patent is subject to a terminal disclaimer.

(21) Appl. No.: 16/834,441

(22) Filed: Mar. 30, 2020

(65) Prior Publication Data
US 2020/0226129 A1 Jul. 16, 2020

Related U.S. Application Data

(63) Continuation of application No. 15/645,763, filed on Jul. 10, 2017, now Pat. No. 10,606,858, which is a
(Continued)

(51) Int. Cl.
*G06F 16/248* (2019.01)
*G06F 16/2457* (2019.01)
*G06F 16/9535* (2019.01)

(52) U.S. Cl.
CPC ...... *G06F 16/248* (2019.01); *G06F 16/24578* (2019.01); *G06F 16/9535* (2019.01)

(58) Field of Classification Search
CPC .............. G06F 16/248; G06F 16/9535; G06F 16/24578; G06F 16/285; G06F 16/355;
(Continued)

(56) References Cited

U.S. PATENT DOCUMENTS 6,529,526 B1 * 3/2003 Schneidewend ... H04N 21/8352
370/486
2005/0251399 A1 * 11/2005 Agarwal ............... G06F 16/958
705/1.1
(Continued)

OTHER PUBLICATIONS

International Search Report & Written Opinion dated Dec. 1, 2015 in International Patent Application No. PCT/US2015/055594.
(Continued)

*Primary Examiner* — Evan Aspinwall
(74) *Attorney, Agent, or Firm* — Byrne Poh LLP

(57) ABSTRACT

Methods, systems, and media for presenting content based on a generic rating are provided. In some implementations, the method comprises: receiving search results; determining country-specific content ratings associated with the search results; converting the country-specific content ratings to generic content ratings associated with the search results; determining that at least one search result is to be blocked based on the generic content ratings and a user-selected generic content rating restriction; in response to determining that a search result is to be blocked, removing the search result from the search results to create modified search results; causing the modified search results to be presented; receiving a selection of content from the presented search results; determining a country-specific content rating associated with the selected content; converting the country-specific content rating to a generic content rating; determining that the selected content is not to be blocked based on the generic content rating and the user-selected generic content rating restriction; and causing the selected content to be presented.

21 Claims, 7 Drawing Sheets

Related U.S. Application Data continuation of application No. 14/612,777, filed on Feb. 3, 2015, now Pat. No. 9,703,846.

(60) Provisional application No. 62/074,546, filed on Nov. 3, 2014, provisional application No. 62/064,376, filed on Oct. 15, 2014.

(58) Field of Classification Search
CPC .. G06F 16/958; G06F 2201/86; G06F 11/324; G06F 11/3438; G06F 16/3334; G06F 16/338; G06F 16/35; G06F 16/55; G06F 16/904; G06N 20/00; G06K 9/6267; G06Q 30/02; G06Q 30/0201; G06Q 30/0269; G06Q 30/0631
USPC ........................................................ 707/723
See application file for complete search history.

(56) References Cited

U.S. PATENT DOCUMENTS

| | | |
|---|---|---|
| 2006/0130118 A1 | 6/2006 | Damm |
| 2007/0260603 A1 | 11/2007 | Tuscano et al. |
| 2009/0034939 A1* | 2/2009 | Okada ................ G11B 27/3027 386/335 |
| 2010/0287584 A1* | 11/2010 | Starikov ............ H04N 21/4532 725/28 |
| 2015/0271554 A1 | 9/2015 | Shetty |

OTHER PUBLICATIONS

Notice of Allowance dated Mar. 8, 2017 in U.S. Appl. No. 14/612,777.
Notice of Allowance dated Nov. 18, 2019 in U.S. Appl. No. 15/645,763.
Office Action dated Jul. 31, 2019 in U.S. Appl. No. 15/645,763.
Resnick et al., "Pics: Internet Access Controls Without Censorship", In Communications of the ACM, vol. 39, No. 10, Oct. 1, 1996, pp. 87-93.
Examination Report dated Oct. 20, 2020 in GB Patent Application No. 1621679.8.

* cited by examiner

METHODS, SYSTEMS, AND MEDIA FOR PRESENTING CONTENT BASED ON A GENERIC RATING

CROSS-REFERENCE TO RELATED APPLICATIONS

This application is a continuation of U.S. patent application Ser. No. 15/645,763, filed Jul. 10, 2017, which is a continuation of U.S. patent application Ser. No. 14/612,777, filed Feb. 3, 2015, which claims the benefit of U.S. Provisional Application No. 62/074,546, filed Nov. 3, 2014, and U.S. Provisional Application No. 62/064,376, filed Oct. 15, 2014, each of which is hereby incorporated by reference herein in its entirety.

TECHNICAL FIELD

The disclosed subject matter relates to methods, systems, and media for presenting content based on a generic content rating.

BACKGROUND

Users are interested in accessing content (e.g., television programs, movies, books, videos, music, news articles, Web sites, etc.) that originates from many different countries, regions, or other groups. Each country, region, or group may use a different rating system used to indicate content which contains material (e.g., violence, pornography, etc.) or which may be unsuitable for particular ages. However, it can be difficult to understand the rating systems of different countries to filter content.

Accordingly, it is desirable to provide new methods, systems, and media for presenting content based on a generic content rating.

SUMMARY

Methods, systems, and media for presenting content based on a generic content rating are provided. In accordance with some implementations of the disclosed subject matter, a method for presenting content based on a generic content rating is provided, the method comprising: receiving one or more search results corresponding to a search query; determining country-specific content ratings associated with the one or more received search results; converting, using a hardware processor, the country-specific content ratings to generic content ratings associated with the one or more search results; determining that at least one search result is to be blocked based on the generic content ratings associated with the one or more search results and a user-selected generic content rating restriction; in response to determining that at least one search result is to be blocked, removing the at least one search result from the one or more search results to create modified search results; causing the modified search results to be presented; receiving a selection of content from the presented modified search results; determining a country-specific content rating associated with the selected content; converting the country-specific content rating to a generic content rating associated with the selected content; determining that the selected content is not to be blocked based on the generic content rating associated with the selected content and the user-selected generic content rating restriction; and in response to determining that the selected content is not to be blocked, causing the selected content to be presented.

In accordance with some implementations of the disclosed subject matter, a system for presenting content based on a generic content rating is provided, the system comprising: hardware processor that is programmed to: receive one or more search results corresponding to a search query; determine country-specific content ratings associated with the one or more received search results; convert the country-specific content ratings to generic content ratings associated with the one or more search results; determine that at least one search result is to be blocked based on the generic content ratings associated with the one or more search results and a user-selected generic content rating restriction; in response to determining that at least one search result is to be blocked, remove the at least one search result from the one or more search results to create modified search results; cause the modified search results to be presented; receive a selection of content from the presented modified search results; determine a country-specific content rating associated with the selected content; convert the country-specific content rating to a generic content rating associated with the selected content; determine that the selected content is not to be blocked based on the generic content rating associated with the selected content and the user-selected generic content rating restriction; and in response to determining that the selected content is not to be blocked, cause the selected content to be presented.

In accordance with some implementations of the disclosed subject matter, non-transitory computer-readable media containing computer executable instructions that, when executed by a processor, cause the processor to perform a method for presenting content based on a generic content rating are provided, the method comprising: receiving one or more search results corresponding to a search query; determining country-specific content ratings associated with the one or more received search results; converting the country-specific content ratings to generic content ratings associated with the one or more search results; determining that at least one search result is to be blocked based on the generic content ratings associated with the one or more search results and a user-selected generic content rating restriction; in response to determining that at least one search result is to be blocked, removing the at least one search result from the one or more search results to create modified search results; causing the modified search results to be presented; receiving a selection of content from the presented modified search results; determining a country-specific content rating associated with the selected content; converting the country-specific content rating to a generic content rating associated with the selected content; determining that the selected content is not to be blocked based on the generic content rating associated with the selected content and the user-selected generic content rating restriction; and in response to determining that the selected content is not to be blocked, causing the selected content to be presented.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various implementations, mechanisms (which can include methods, systems, and media) for presenting content based on a generic content rating are provided.

In some implementations, the mechanisms described herein can receive content (e.g., search results, media content, books, Web sites, and/or any other suitable content) from different countries, locations, and/or groups, and can convert a specific content rating associated with the content to a generic content rating. In some implementations, the mechanisms can determine a user-selected generic content rating restriction and can determine whether the received content is to be blocked based on the user-selected generic content rating restriction and the generic content rating corresponding to the received content. In some implementations, in response to determining that the content is not to be blocked, the mechanisms can cause the content to be presented on a user device.

In some implementations, the specific content rating can be associated with a rating system used by a particular country and/or region. Additionally or alternatively, in some implementations, the specific content rating can be associated with any suitable group (e.g., a particular association that produces movies, a creator of a particular channel on a video sharing service, and/or any other suitable group).

In some implementations, the user-selected generic content rating restriction can be indicated using a user interface presented by a user device other than the user device on which the content is to be presented. In some such implementations, the user-selected generic content rating restriction can be associated with a particular user account, and can be used to block content accessed in association with the user account from any other user device.

Figure 1:
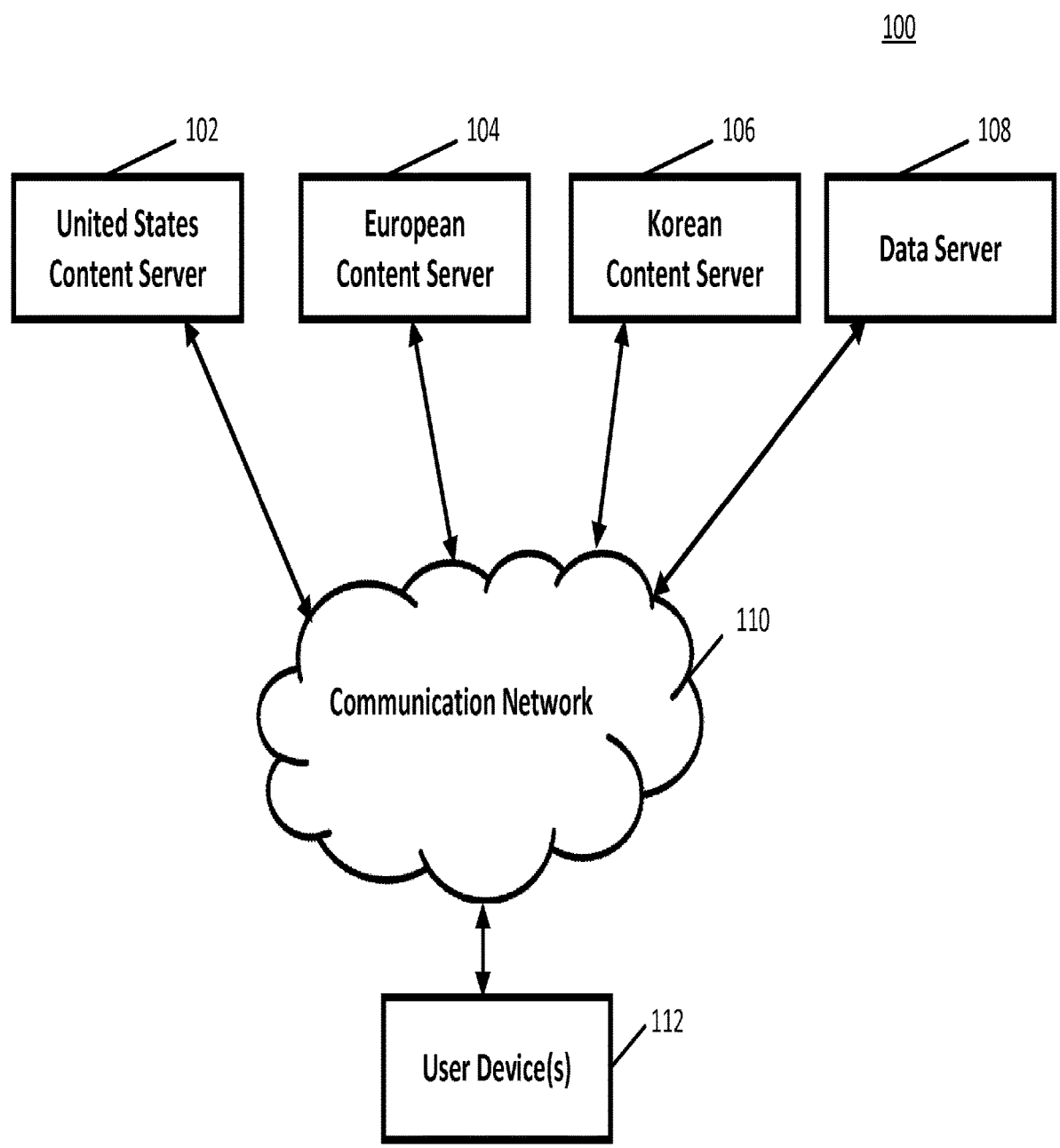
FIG. 1 shows a schematic diagram of an example of a system for presenting content based on a generic content rating in accordance with some implementations of the disclosed subject matter.

Turning to FIG. 1, an example 100 of hardware for presenting content based on a generic content rating that can be used in accordance with some implementations is shown.

As illustrated, hardware 100 can include one or more servers, including servers providing content from one or more countries and/or locations, such as a United States content server 102, a European content server 104, and a Korean content server 106, a data server 108, a communication network 110, and one or more user devices 112.

United States content server 102, European content server 104, and Korean content server 106 can be any suitable servers for storing content and delivering the content to a user device 112 in some implementations. For example, content servers 102, 104, and/or 106 can be servers that stream media content to user device 112 via communication network 110. Content provided by content servers 102, 104, and/or 106 can be any suitable content, such as video content, audio content, television programs, movies, cartoons, sound effects, audiobooks, streaming live content (e.g., a streaming radio show, a live concert, and/or any other suitable type of streaming live content), electronic books, search results and/or any other suitable type of content. Content can be created and uploaded to content servers 102, 104, and/or 106 by any suitable entity. In some implementations, content delivered by content servers 102, 104, and/or 106 can be delivered in association with a content rating, which can indicate suitable ages for viewing the content and/or the presence of objectionable content. In some implementations, any of content servers 102, 104, and/or 106 can be omitted. Additionally or alternatively, in some implementations, content servers corresponding to any other suitable countries, locations, and/or groups can be included.

Data server 108 can be any suitable server for storing user-selected generic content rating restrictions that indicate content that is to be blocked and/or unblocked, for converting a country-specific content rating to a generic content rating, and/or for any other suitable functions. For example, in some implementations, data server 108 can convert a country-specific content rating to a generic content rating to determine if particular content is to be blocked, as described below in connection with FIG. 7. As another example, in some implementations, data server 108 can receive a user-selected generic content rating restriction (e.g., from a user interface as shown in and described below in connection with FIG. 4) and can determine whether particular content is to be blocked based on the user-selected generic content rating restriction.

Communication network 110 can be any suitable combination of one or more wired and/or wireless networks in some implementations. For example, communication network 110 can include any one or more of the Internet, a mobile data network, a satellite network, a local area network, a wide area network, a telephone network, a cable television network, a WiFi network, a WiMax network, and/or any other suitable communication network.

User device 112 can include any one or more user devices suitable for receiving and/or presenting content. For example, in some implementations, user device 112 can include mobile devices, such as a mobile phone, a tablet computer, a laptop computer, a vehicle (e.g., a car, a boat, an airplane, or any other suitable vehicle) entertainment system, a portable media player, or any other suitable mobile device. As another example, in some implementations, user device 112 can include non-mobile devices such as a desktop computer, a set-top box, a television, a streaming media player, a game console, or any other suitable non-mobile device.

Although United States content server 102, European content server 104, Korean content server 106, and data server 108 are illustrated as separate devices, any one or more of these devices can be combined into one device in some implementations. Also, although only one each of United States content server 102, European content server 104, Korean content server 106, and data server 108 are shown in FIG. 1 to avoid over-complicating the figure, any suitable one or more of each device can be used in some implementations.

Although only one user device 112 is shown in FIG. 1 to avoid over-complicating the figure, any suitable number of each of these devices, and any suitable types of these devices, can be used in some implementations.

Figure 2:
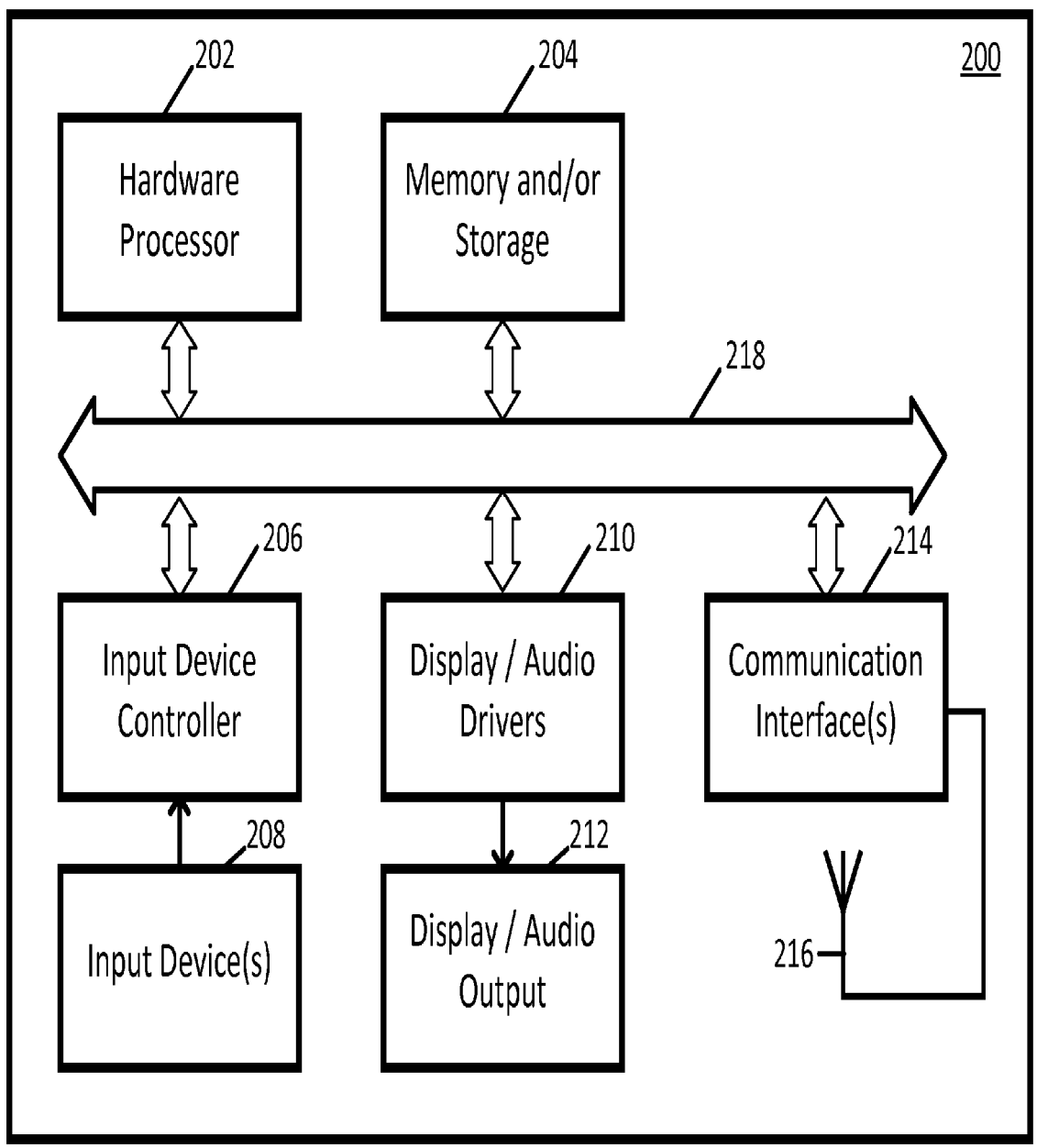
FIG. 2 shows an example of hardware that can be used in a server and/or a user device in accordance with some implementations of the disclosed subject matter.

United States content server 102, European content server 104, Korean content server 106, data server 108, and user device 112 can be implemented using any suitable hardware in some implementations. For example, in some implementations, devices 102, 104, 106, 108, and 112 can be implemented using any suitable general purpose computer or special purpose computer. For example, a server may be implemented using a special purpose computer. Any such general purpose computer or special purpose computer can include any suitable hardware. For example, as illustrated in example hardware 200 of FIG. 2, such hardware can include hardware processor 202, memory and/or storage 204, an input device controller 206, an input device 208, display/audio drivers 210, display and audio output circuitry 212, communication interface(s) 214, an antenna 216, and a bus 218.

Hardware processor 202 can include any suitable hardware processor, such as a microprocessor, a micro-controller, digital signal processor(s), dedicated logic, and/or any other suitable circuitry for controlling the functioning of a general purpose computer or a special purpose computer in some implementations.

Memory and/or storage 204 can be any suitable memory and/or storage for storing programs, data, media content, and/or any other suitable information in some implementations. For example, memory and/or storage 204 can include random access memory, read-only memory, flash memory, hard disk storage, optical media, and/or any other suitable memory.

Input device controller 206 can be any suitable circuitry for controlling and receiving input from one or more input devices 208 in some implementations. For example, input device controller 206 can be circuitry for receiving input from a touch screen, from one or more buttons, from a voice recognition circuit, from a microphone, from a camera, from an optical sensor, from an accelerometer, from a temperature sensor, from a near field sensor, and/or any other type of input device.

Display/audio drivers 210 can be any suitable circuitry for controlling and driving output to one or more display/audio output circuitries 212 in some implementations. For example, display/audio drivers 210 can be circuitry for driving an LCD display, a speaker, an LED, or any other type of output device.

Communication interface(s) 214 can be any suitable circuitry for interfacing with one or more communication networks, such as network 110 as shown in FIG. 1. For example, interface(s) 214 can include network interface card circuitry, wireless communication circuitry, and/or any other suitable type of communication network circuitry.

Antenna 216 can be any suitable one or more antennas for wirelessly communicating with a communication network in some implementations. In some implementations, antenna 216 can be omitted when not needed.

Bus 218 can be any suitable mechanism for communicating between two or more components 202, 204, 206, 210, and 214 in some implementations.

Any other suitable components can be included in hardware 200 in accordance with some implementations.

FIGS. 3-6 show examples of user interfaces that can be used to restrict presentation of search results and/or other content by specifying generic content ratings to be applied to content, regardless of the country associated with the content. In some implementations, a Personal Identification Number (PIN) and/or a password can be requested before presentation of any of the user interfaces associated with FIGS. 3-6. Note that, in some implementations, the user interfaces shown in FIGS. 3-6 can be presented on a user device other than the user device used to present search results and/or other content. For example, in some implementations, a user-selected generic content rating restriction can be received from a user interface presented on a user device and can be stored in association with a particular user account. The user-selected generic content rating restriction can then be applied to content presented on other user devices in association with the user account. In some implementations, information received from the user interfaces shown in FIGS. 3-6 can be stored on data server 108.

Figure 3:
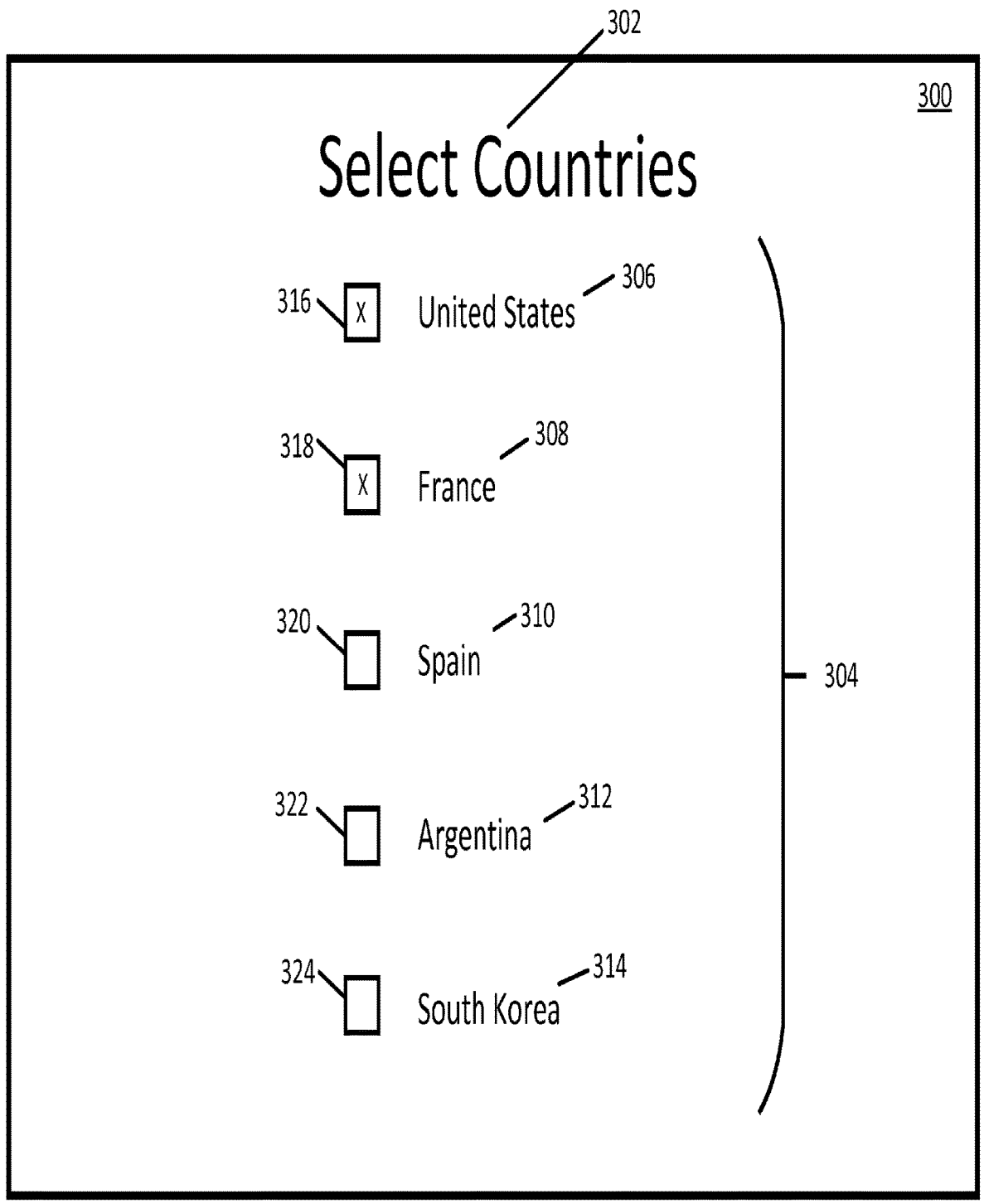
FIG. 3 shows an example of a user interface for receiving selections of countries from which content can be presented in accordance with some implementations of the disclosed subject matter.

Turning to FIG. 3, an example 300 of a user interface for receiving selections of one or more countries from which country-specific content ratings are to be converted to generic content ratings is shown in accordance with some implementations of the disclosed subject matter. As illustrated, user interface 300 can include a title 302 and country options 304.

Title 302 can be any title indicating the content of user interface 300. In some implementations, title 302 can include any suitable text, images, icons, graphics, animations, and/or any other suitable content. Note that the location of title 302 in user interface 300 is shown as an example, and title 302 can be positioned at any suitable location. In some implementations, title 302 can be omitted.

Country options 304 can include one or more countries and/or regions, such as countries 306, 308, 310, 312, and 314. Although five countries are shown in country options 304, any suitable number of countries (e.g., one, two, five, ten, twenty, fifty, and/or any other suitable number) and/or regions can be included. Additionally or alternatively, in some implementations, countries in country options 304 can be grouped in any suitable manner. For example, in some implementations, countries in country options 304 can be grouped by continent. In some such implementations, selection of a particular continent (e.g., North America) can cause countries located in that continent (e.g., Canada, United States, and Mexico) to be presented in country options 304. Note that, in some implementations, country options 304 can include content rating systems that do not correspond to a particular country and/or geographic region, but instead correspond to a rating system created by any other suitable entity (e.g., a particular network, a particular channel of a video sharing service, and/or any other suitable entity).

Country options 304 can additionally include selection inputs corresponding to each country in country options 304, such as selection inputs 316, 318, 320, 322, and 324. In some implementations, selection inputs 316, 318, 320, and 324 can include any suitable user interface controls, such as radio buttons, check boxes, drop-down menus, and/or any other suitable user interface controls.

Figure 4:
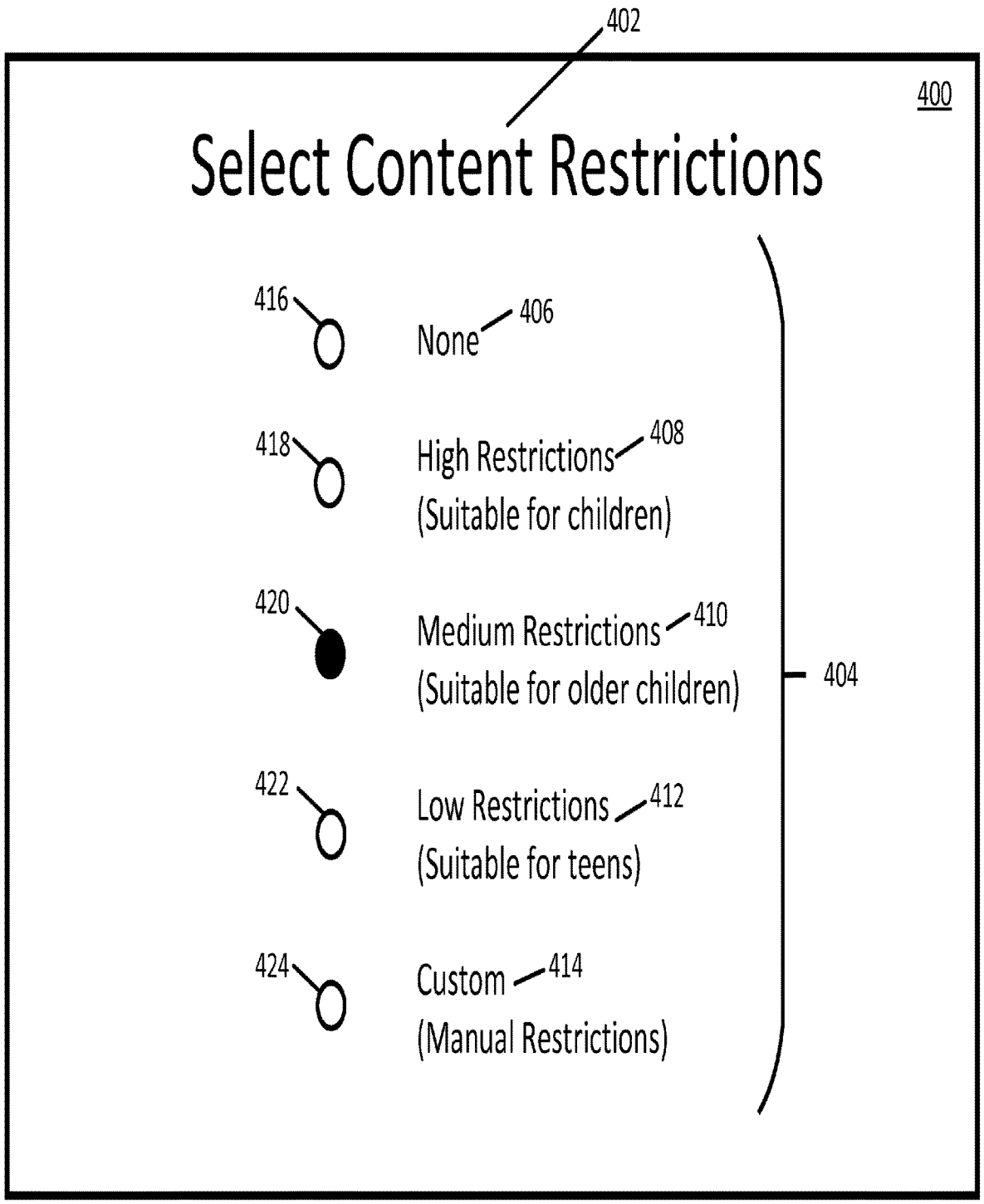
FIG. 4 shows an example of a user interface for receiving a selection of a generic content rating restriction in accordance with some implementations of the disclosed subject matter.

Turning to FIG. 4, an example 400 of a user interface for receiving a user-selected generic content rating restriction that is to be applied to content from countries selected in user interface 300 is shown in accordance with some implementations of the disclosed subject matter. As illustrated, user interface 400 can include a title 402 and rating options 404.

Title 402 can be any title indicating the content of user interface 400. In some implementations, title 402 can include any suitable text, images, icons, graphics, animations, and/or any other suitable content. Note that the location of title 402 in user interface 400 is shown as an example, and title 402 can be positioned at any suitable location. In some implementations, title 402 can be omitted.

Rating options 404 can include one or more generic rating restrictions, such as generic rating restrictions 406, 408, 410, 412, and 414. Although five rating restrictions are shown in rating options 404, any suitable number of ratings restrictions (e.g., one, two, four, eight, and/or any other suitable number) can be included. In some implementations, the generic rating restrictions can correspond to any suitable content restriction criteria. For example, in some implementations, the generic rating restrictions can indicate a minimum suggested age to view content within a particular rating and/or general age guidelines for viewing content within a particular rating (e.g., "suitable for younger children," "suitable for older children," "suitable for teenagers," and/or any other suitable general age guidelines). In some implementations, rating options 404 can include an option for no content restrictions and/or an option to manually set content restrictions, as shown in FIG. 4.

Rating options 404 can additionally include selection inputs corresponding to each content rating restriction in rating options 404, such as selection inputs 416, 418, 420, 422, and 424. In some implementations, selection inputs 416, 418, 420, 422, and 424 can include any suitable user interface controls, such as radio buttons, check boxes, drop-down menus, and/or any other suitable user interface controls.

In some implementations, any suitable additional information can be presented in user interface 400 in any suitable manner. For example, in instances where a content rating restriction in rating options 404 indicates a general age guideline (e.g., "suitable for older children"), user interface 400 can additionally indicate a specific age range (e.g., "children over 10 years old"), for example, in response to determining that the particular content rating restriction has been selected (e.g., clicked and/or tapped) and/or indicated (e.g., with a cursor). As another example, user interface 400 can additionally indicate types of content (e.g., nudity, violence, and/or any other suitable types of content) that would be blocked if a particular content rating restriction were selected.

Figure 5:
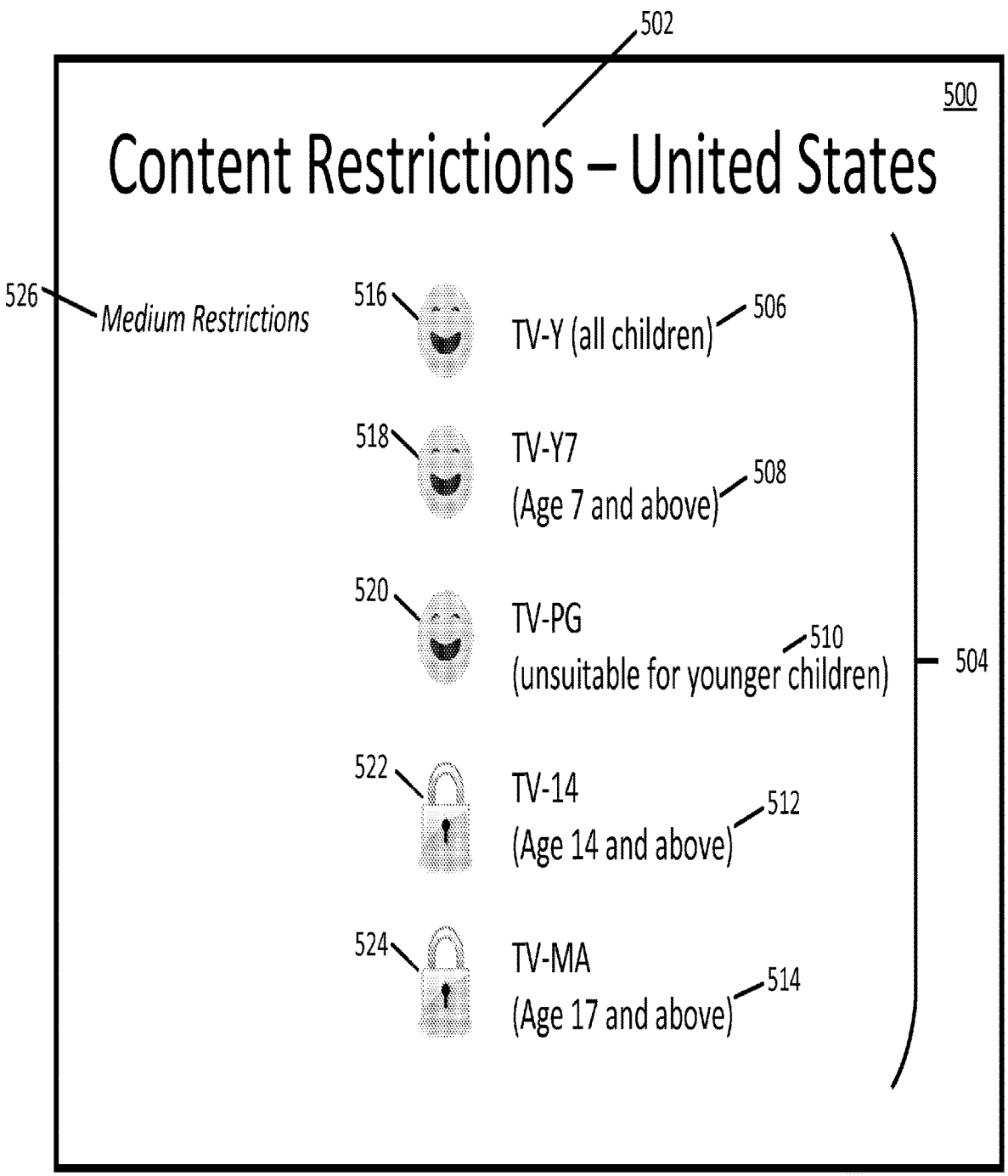
FIG. 5 shows an example of a user interface for presenting indications of content corresponding to particular country-specific content ratings which have been blocked based on a user-selected generic content rating restriction in accordance with some implementations of the disclosed subject matter.

Turning to FIG. 5, an example 500 of a user interface for presenting indications of blocked and unblocked content corresponding to country-specific content ratings based on a user-selected generic rating restriction received by user interface 400 is shown in accordance with some implementations of the disclosed subject matter. In some implementations, user interface 500 can be presented in response to determining that a particular generic content rating has been selected using user interface 400, as shown in and described above in connection with FIG. 4. As illustrated, user interface 500 can include a title 502 and group of country-specific content ratings 504.

Title 502 can be any title indicating the content of user interface 500. For example, as shown in FIG. 5, title 502 can indicate a country corresponding to group of country-specific content ratings 504. In some implementations, title 502 can include any suitable text, images, icons, graphics, animations, and/or any other suitable content. Note that the location of title 502 in user interface 500 is shown as an example, and title 502 can be positioned at any suitable location. In some implementations, title 502 can be omitted.

Group of country-specific content ratings 504 can include any suitable content ratings specific to a particular country, such as country-specific content ratings 506, 508, 510, 512, and 514. Although five country-specific content ratings are shown in user interface 500, any suitable number (e.g., one, two, five, ten, and/or any other suitable number) can be included. Furthermore, the country-specific content ratings can correspond to any suitable type(s) of content, such as television programs, movies, books, audio programs, music, search results, and/or any other suitable type of content.

In some implementations, a user-selected generic content rating restriction (e.g., indicated using user interface 400 as shown in and described above in connection with FIG. 4) can be indicated by generic content rating indicator 526. Group of country-specific content ratings 504 can include restricted content indicators (such as indicators 516, 518, 520, 522, and 524) that indicate whether content corresponding to each country-specific rating would be blocked based on the user-selected generic content rating restriction indicated by indicator 526. In some implementations, an icon and/or text associated with the restricted content indicators can indicate whether the associated content is to be unblocked (as in indicators 516, 518, and 520) or blocked (as in indicators 522 and 524). In some implementations, indicators 516, 518, 520, 522, and 524 can include any suitable text, icons, images, graphics, animations, and/or any other suitable content. In some implementations, whether content corresponding to each country specific-rating would be blocked by on the selection of the generic content rating can be determined using any suitable technique(s), such as those described below in connection with process 700 of FIG. 7. Additionally or alternatively, in some implementations, indicators 516, 518, 520, 522, and/or 524 can be selectable, allowing a particular country-specific content rating to be selected and/or deselected by a user, thereby overriding a determination made by process 700.

Figure 6:
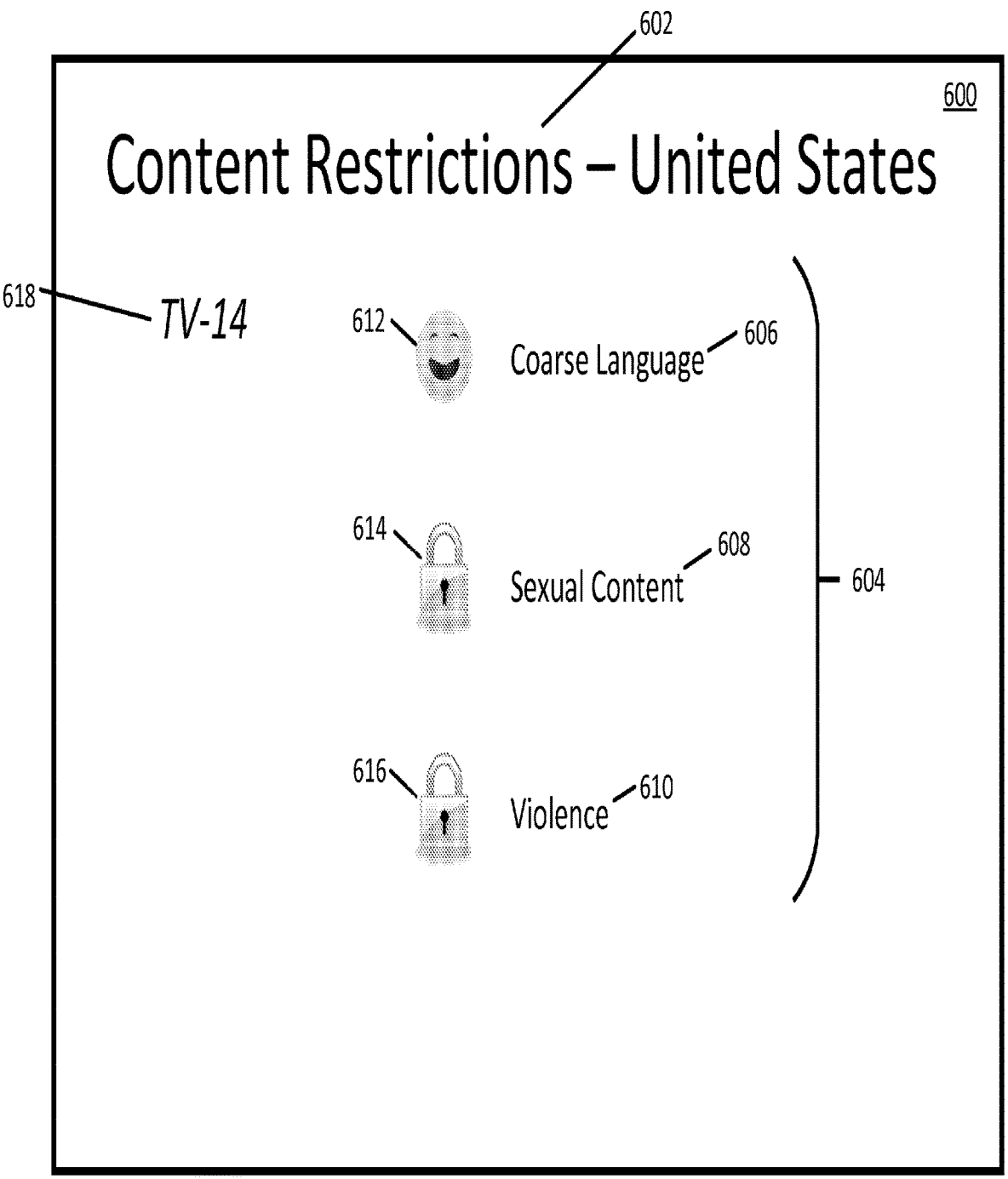
FIG. 6 shows an example of a user interface for receiving selections of types of objectionable content to be blocked or unblocked for a particular content rating in accordance with some implementations of the disclosed subject matter.

FIG. 6 shows an example 600 of a user interface for receiving selections of more particular types of content that should be blocked or not blocked for a particular rating (e.g., "TV-G," "TV-14," and/or any other suitable content rating) in accordance with some implementations of the disclosed subject matter. In some implementations, user interface 600 can be presented in response to determining that a particular country-specific content rating from group of country-specific content ratings 504 has been selected (e.g., tapped and/or clicked). In some implementations, the particular country-specific content rating that was selected can be indicated in user interface 600 by a selected rating indicator 618. As illustrated, user interface 600 can also include a title 602 and a group of content types 604.

Title 602 can be any title indicating the content of user interface 600. In some implementations, title 602 can include any suitable text, images, icons, graphics, animations, and/or any other suitable content. Note that the location of title 602 in user interface 600 is shown as an example, and title 602 can be positioned at any suitable location. In some implementations, title 602 can be omitted.

Group of content types 604 can include any types of objectionable content, such as content types 606, 608, and 610, corresponding to objectionable content such as coarse language, sexual content, and/or violence. Note that although three types of objectionable content are shown in group of content types 604, in some implementations, any suitable number (e.g., one, five, ten, and/or any other suitable number) can be included. In some implementations, the types of objectionable content can additionally or alternatively include types related to religious values (e.g., content that portrays people of particular religious groups and/or content that is typically considered offensive to particular religious groups), cultural values (e.g., content that portrays particular lifestyles), and/or any other types of content. Additionally, in some implementations, the types of content included in group of content types 604 can include any suitable level of detail. As a specific example, in some implementations, types of content can include "fantasy violence," "gun violence," and/or other particular types of violence.

As shown in FIG. 6, particular types of objectionable content within group of content types 604 can be associated with selectable indicators, such as indicators 612, 614, and/or 616. In some implementations, selection of a particular indicator can cause the associated type of objectionable content to be blocked (as in the case of indicators 614 and 616) or unblocked (as in the case of indicator 612), regardless of the associated content rating. In some implementations, a default value of indicators 612, 614, and/or 616 can be set to either blocked or unblocked, for example, when user interface 600 is initially presented.

Figure 7:
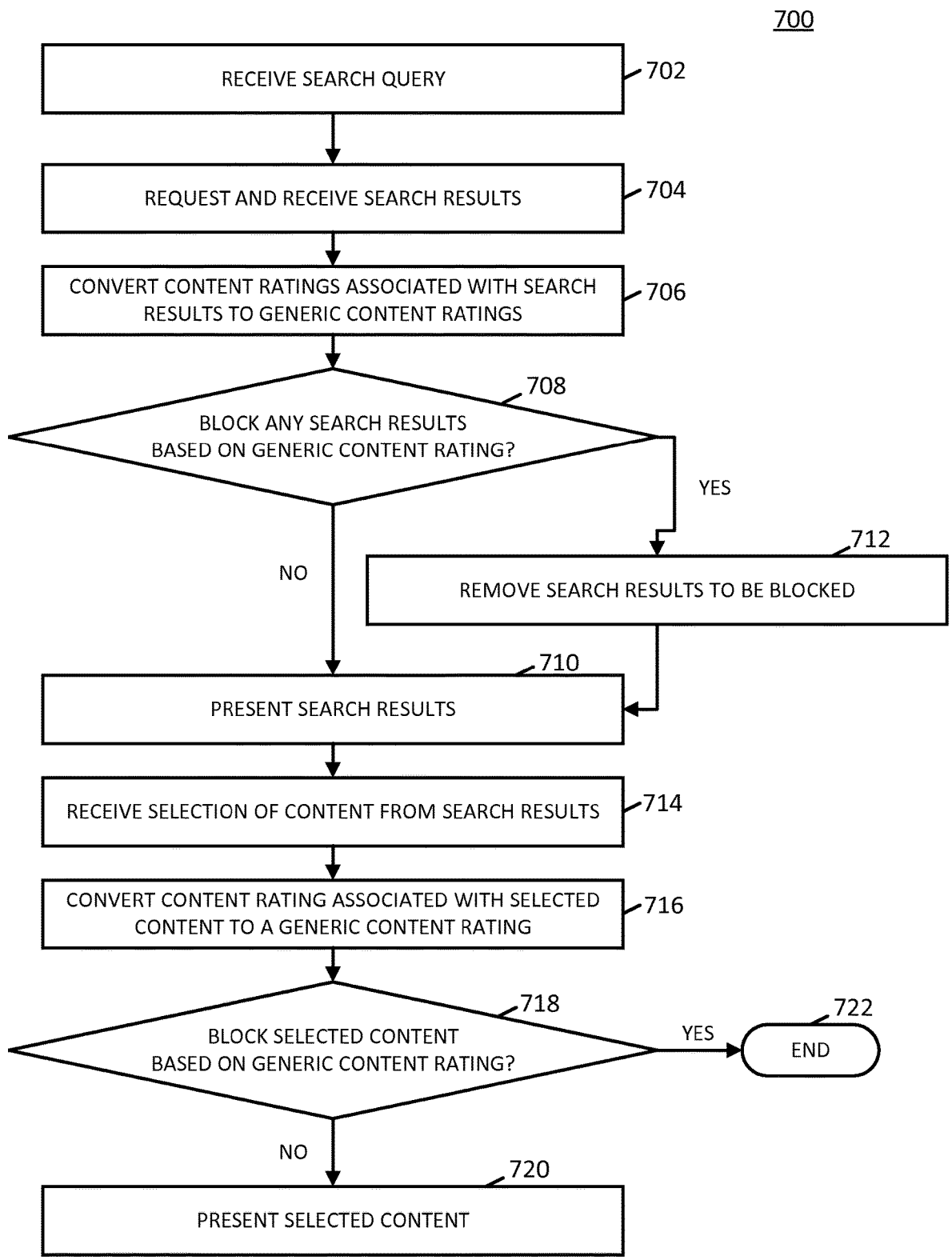
FIG. 7 shows an example of a process for presenting content based on a generic content rating in accordance with some implementations of the disclosed subject matter.

Turning to FIG. 7, an example 700 of a process for presenting content based on a user-selected generic content rating restriction is shown in accordance with some implementations of the disclosed subject matter. In some implementations, portions of process 700 can be implemented on data server 108 and/or one or more user devices.

Process 700 can begin by receiving a search query at 702. In some implementations, the search query can correspond to any suitable searching domain. For example, in some implementations, the search query can correspond to a search for a particular type of content (e.g., television programs, videos, music, movies, audiobooks, books, news articles, and/or any other suitable type of content). As another example, in some implementations, the search query can correspond to a search for Web sites.

Process 700 can request search results based on the received query and can receive the search results at 704. In some implementations, the search results can be received in any suitable manner and can include any suitable information. For example, in some implementations, the search results can include hyperlinks to content matching the search query, one or more images related to the content matching the search query, and/or any suitable files (e.g., audio files, video files, and/or any other suitable files). As another example, in some implementations, the search results can indicate a country associated with a content item (e.g., a country associated with a server storing the content item, a country in which the content item was created and/or uploaded to a server storing the content item, and/or any other suitable country) indicated in the search results. As still another example, in some implementations, the search results can indicate content ratings (e.g., "TV-G," "TV-MA," and/or any other suitable content ratings) associated with one or more content items indicated in the search results. As a more particular example, in some implementations, the content rating can correspond to a content rating system of a particular country and/or region (e.g., a country in which the content was created and/or uploaded to a server, and/or any other suitable country). As still another example, in some implementations, the search results can indicate the presence of particular types of objectionable content (e.g., violence, sexual content, etc.). In some such implementations, the content rating can additionally specify the particular country associated with the content rating.

Process 700 can convert the content ratings associated with the received search results to generic content ratings at 706. As a specific example, in instances where a country-specific content rating is a United States content rating of "TV-G," process 700 can determine that the generic content rating is to be "suitable for all ages." Process 700 can use any suitable information and/or technique(s) to convert a country-specific content rating to a generic content rating. For example, in some implementations, process 700 can use a table stored on data server 108 to convert a country-specific content rating to a generic content rating. In some implementations, a mapping between a particular country-specific content rating to a generic content rating can be stored in any suitable manner (e.g., using Extensible Markup Language, or "XML," tags, using a database, and/or in any other suitable manner). For example, data server 108 can store an indicator of an age limit for a country-specific rating using one or more XML tags. As a specific example, a particular country-specific rating and a corresponding generic age limit can be stored with an XML tag such as "<rating-definition:name="US_TV_G" contentAgeHint="0"/>." Process 700 can determine a generic age limit corresponding to the country-specific rating (e.g., based on the "contentAgeHint" field) and can use the generic age limit to determine the corresponding generic rating. In some implementations, process 700 can query data server 108 by transmitting an indicator of the country-specific content rating (e.g., "TV-G," and/or any other content rating) to data server 108 and can receive an indicator of a corresponding generic content rating (e.g., "suitable for all ages").

Process 700 can determine whether one or more of the received search results are to be blocked at 708 based on a user-selected generic content rating restriction (e.g., received by user interface 400 as shown in and described above in connection with FIG. 4). In some implementations, process 700 can determine the user-selected generic content rating restriction by querying data server 102 before determining whether one or more of the received search results are to be blocked. In some implementations, process 700 can determine whether the user-selected generic content rating restriction is more or less restrictive than the generic content rating associated with the search result(s). As a specific example, if the user-selected generic content rating restriction indicates that only content suitable for younger children (e.g., children of any age) is to be shown, process 700 can determine that search results corresponding to content suitable for older children and/or teenagers (e.g., children over age ten) is to be blocked. In some implementations, process 700 can allow search results corresponding to content that would be blocked based on the user-selected generic content rating restriction to be presented, for example, if it is determined that text and/or images contained in the search results do not include content that would be blocked. As a specific example, if it is determined that a particular search result corresponds to a movie that would be blocked (e.g., due to containing nudity and/or violence) but that the text and/or images corresponding to the search result do not contain objectionable content, process 700 can determine that the search results are to be presented. In some implementations, process 700 can determine that portions of a particular search result are to be modified before presentation of the search result. As a specific example, in some implementations, process 700 can determine that an image associated with a particular search result should not be presented based on a content rating associated with the image, and process 700 can determine that the search result is to be presented without the image.

In some implementations, in instances where the user-selected generic content rating restrictions include restrictions other than those that relate to age limits (e.g., restrictions based on the presence of violence, sexual content, and/or any other type of objectionable content, restrictions based on religious and/or cultural values, and/or any other suitable type of restrictions as received by user interface 600 as shown in and described above in connection with FIG. 6), process 700 can use any information that indicates whether the content associated with a received search result contains the particular types of objectionable content to determine whether the search result is to be blocked. For example, in some implementations, process 700 can determine whether the content contains the objectionable content based on a tag associated with the content, a description associated with the rating corresponding to the content, an analysis of text associated with the search result, and/or using any other suitable information.

If, at 708, it is determined that no search results are to be removed ("No" at 708), process 700 can cause the search results to be presented at 710. In some implementations, the search results can be presented on any suitable user device. In some implementations, the search results can be presented in any suitable manner, for example, in a Web site, in an application corresponding to a media content streaming service, and/or any in any other suitable manner.

If, at 708, it is determined that one or more search results are to be removed ("Yes" at 708), process 700 can remove the search results at 712, and can then proceed to 710 to cause the modified group of search results to be presented.

Process 700 can receive a selection of content from the search results at 714. In some implementations, the selected content can correspond to any suitable type of content, such as media content (e.g., a television program, a movie, a video, music, an audiobook, and/or any other suitable type of media content), a book, a news article, a Web site, and/or any other suitable type of content. In some implementations, the content selection can be received by a user device used to present the search results. An indication of the selected content can be received in any suitable manner, for example, based on a determination that a particular link, icon, and/or image in the search results has been clicked and/or tapped, based on a determination that a particular content item has been indicated using a remote control, and/or based on any other suitable information.

Process 700 can convert a country-specific content rating associated with the selected content to a generic content rating at 716. As described above in connection with block 706, process 700 can use any suitable information and/or technique(s) to convert the country-specific content rating to a generic content rating, such as by using a mapping stored on data server 108. In some implementations, process 700 can determine the generic content rating by querying data server 108 by transmitting an indicator of the country-specific content rating (e.g., "TV-G," and/or any other content rating) to data server 108 and can receive an indicator of a corresponding generic content rating (e.g., "suitable for all ages").

At 718, process 700 can determine whether the selected content is to be blocked based on the generic content rating determined at block 716. Similarly to block 708, process 700 can determine a user-selected generic content rating restriction (e.g., indicated using user interface 400 as shown in and described above in connection with FIG. 4) and can determine whether the user-selected generic content rating restriction is more and/or less restrictive than the generic content rating associated with the selected content. If it is determined that the user-selected generic content rating restriction is more restrictive than the generic content rating associated with the selected content, process 700 can determine that the selected content is to be blocked.

In some implementations, process 700 can additionally and/or alternatively determine whether the selected content is to be blocked based on any other suitable information, such as a day of the week and/or a time of day. For example, in some implementations, process 700 can determine that content corresponding to a particular generic content rating is to be blocked only on particular days of the week (e.g., Monday-Friday, and/or any other particular days of the week) and/or at particular times of the day (e.g., before 10 p.m., between 7 a.m. and 9 a.m., and/or any other particular times of the day). In some implementations, days of the week and/or times of day during which content is to be blocked can be specified using a user interface (not shown).

If, at 718, it is determined that the selected content is not to be blocked ("No" at 718), process 700 can cause the selected content to be presented at 720. Process 700 can cause the selected content to be presented on any suitable user device and in any suitable manner. For example, in some implementations, process 700 can cause a selected video and/or television program to be presented on a mobile device, a television, a desktop computer, and/or on any other suitable user device. As another example, in some implementations, process 700 can cause the selected content to be downloaded to a particular user device from one of content servers 102, 104, and/or 106.

If, at 718, it is determined that the selected content is to be blocked ("Yes" at 718), process 700 can terminate at 722. Alternatively, in some implementations, process 700 can cause a user interface (not shown) to be presented that receives a PIN and/or a password, and after verifying the received PIN and/or password, can cause the blocked content to be presented.

It should be understood that at least some of the above described blocks of the process of FIG. 7 can be executed or performed in any order or sequence not limited to the order and sequence shown in and described in the figure. Also, some of the above blocks of the process of FIG. 7 can be executed or performed substantially simultaneously where appropriate or in parallel to reduce latency and processing times. Additionally or alternatively, some of the above described blocks of the process of FIG. 7 can be omitted.

In some implementations, any suitable computer readable media can be used for storing instructions for performing the functions and/or processes herein. For example, in some implementations, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described here collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed is:

1. A method for presenting content based on a generic content rating, the method comprising:
   receiving one or more search results corresponding to a search query;
   determining location-specific content ratings associated with the one or more received search results;
   converting, using a hardware processor, the location-specific content ratings to generic content ratings associated with the one or more search results by transmitting an indicator of the location-specific content ratings to a server and receiving, from the server, the generic content ratings;
   determining that at least one search result is to be blocked based on the generic content ratings associated with the one or more search results and a user-selected generic content rating restriction;
   in response to determining that at least one search result is to be blocked, removing the at least one search result from the one or more search results to create modified search results; and
   causing the modified search results to be presented.

2. The method of claim 1, further comprising:
   receiving a selection of content from the presented modified search results;
   determining a location-specific content rating associated with the selected content;
   converting the location-specific content rating to a generic content rating associated with the selected content;
   determining that the selected content is not to be blocked based at least in part on the generic content rating associated with the selected content and the user-selected generic content rating restriction; and
   in response to determining that the selected content is not to be blocked, causing the selected content to be presented.

3. The method of claim 2, wherein converting the location-specific content ratings associated with the one or more received search results to generic content ratings associated with the one or more search results further comprises determining an age suitable for viewing the one or more search results.

4. The method of claim 2, further comprising:
   determining that the selected content is to be blocked based at least in part on the generic content rating associated with the selected content and the user-selected generic content rating restriction;
   requesting authorization to present the selected content; and
   in response to receiving authorization to present the selected content, causing the selected content to be presented.

5. The method of claim 1, further comprising:
   determining that a portion of the at least one search result is to be blocked based on the generic content ratings; and
   modifying the at least one search result by removing the portion of the at least one search result.

6. The method of claim 1, further comprising receiving the user-selected generic content rating restriction from a user interface.

7. The method of claim 1, wherein the user-selected generic content rating restriction is stored in association with a user account, and wherein the selected content is presented in association with the user account.

8. A system for presenting content based on a generic content rating, the system comprising:
   a hardware processor that is programmed to:
      receive one or more search results corresponding to a search query;
      determine location-specific content ratings associated with the one or more received search results;
      convert the location-specific content ratings to generic content ratings associated with the one or more search results by transmitting an indicator of the location-specific content ratings to a server and receiving, from the server, the generic content ratings;
      determine that at least one search result is to be blocked based on the generic content ratings associated with the one or more search results and a user-selected generic content rating restriction;
      in response to determining that at least one search result is to be blocked, remove the at least one search result from the one or more search results to create modified search results; and
      cause the modified search results to be presented.

9. The system of claim 8, wherein the hardware processor is further programmed to:
   receive a selection of content from the presented modified search results;
   determine a location-specific content rating associated with the selected content;
   convert the location-specific content rating to a generic content rating associated with the selected content;
   determine that the selected content is not to be blocked based at least in part on the generic content rating associated with the selected content and the user-selected generic content rating restriction; and
   in response to determining that the selected content is not to be blocked, cause the selected content to be presented.

10. The system of claim 9, wherein converting the location-specific content ratings associated with the one or more received search results to generic content ratings associated with the one or more search results further comprises determining an age suitable for viewing the one or more search results.

11. The system of claim 9, wherein the hardware processor is further programmed to:
determine that the selected content is to be blocked based at least in part on the generic content rating associated with the selected content and the user-selected generic content rating restriction;
request authorization to present the selected content; and
in response to receiving authorization to present the selected content, cause the selected content to be presented.

12. The system of claim 7, wherein the hardware processor is further programmed to:
determine that a portion of the at least one search result is to be blocked based on the generic content ratings; and
modify the at least one search result by removing the portion of the at least one search result.

13. The system of claim 7, wherein the hardware processor is further programmed to receive the user-selected generic content rating restriction from a user interface.

14. The system of claim 7, wherein the user-selected generic content rating restriction is stored in association with a user account, and wherein the selected content is presented in association with the user account.

15. A non-transitory computer-readable medium containing computer executable instructions that, when executed by a processor, cause the processor to perform a method for presenting content based on a generic content rating, the method comprising:
receiving one or more search results corresponding to a search query;
determining location-specific content ratings associated with the one or more received search results;
converting the location-specific content ratings to generic content ratings associated with the one or more search results by transmitting an indicator of the location-specific content ratings to a server and receiving, from the server, the generic content ratings;
determining that at least one search result is to be blocked based on the generic content ratings associated with the one or more search results and a user-selected generic content rating restriction;
in response to determining that at least one search result is to be blocked, removing the at least one search result from the one or more search results to create modified search results; and
causing the modified search results to be presented.

16. The non-transitory computer-readable medium of claim 15, wherein the method further comprises:
receiving a selection of content from the presented modified search results;
determining a location-specific content rating associated with the selected content;
converting the location-specific content rating to a generic content rating associated with the selected content;
determining that the selected content is not to be blocked based at least in part on the generic content rating associated with the selected content and the user-selected generic content rating restriction; and
in response to determining that the selected content is not to be blocked, causing the selected content to be presented.

17. The non-transitory computer-readable medium of claim 16, wherein converting the location-specific content ratings associated with the one or more received search results to generic content ratings associated with the one or more search results further comprises determining an age suitable for viewing the one or more search results.

18. The non-transitory computer-readable medium of claim 16, wherein the method further comprises:
determining that the selected content is to be blocked based at least in part on the generic content rating associated with the selected content and the user-selected generic content rating restriction;
requesting authorization to present the selected content; and
in response to receiving authorization to present the selected content, causing the selected content to be presented.

19. The non-transitory computer-readable medium of claim 15, wherein the method further comprises:
determining that a portion of the at least one search result is to be blocked based on the generic content ratings; and
modifying the at least one search result by removing the portion of the at least one search result.

20. The non-transitory computer-readable medium of claim 15, wherein the method further comprises receiving the user-selected generic content rating restriction from a user interface.

21. The non-transitory computer-readable medium of claim 15, wherein the user-selected generic content rating restriction is stored in association with a user account, and wherein the selected content is presented in association with the user account.

* * * * *